(12) United States Patent
Shikano et al.

(10) Patent No.: US 8,226,869 B2
(45) Date of Patent: Jul. 24, 2012

(54) METHOD AND DEVICE FOR REPLICATING STRUCTURE

(75) Inventors: Masanao Shikano, Sagamihara (JP);
Seiji Morizaki, Sagamihara (JP);
Yoshiyuki Takakusagi, Kawasaki (JP);
Michihiro Ohishi, Sagamihara (JP)

(73) Assignee: 3M Innovative Properties Company, St. Paul, MN (US)

( * ) Notice: Subject to any disclaimer, the term of this patent is extended or adjusted under 35 U.S.C. 154(b) by 257 days.

(21) Appl. No.: 12/299,020

(22) PCT Filed: May 9, 2007

(86) PCT No.: PCT/US2007/068573
§ 371 (c)(1), (2), (4) Date: Jan. 23, 2009

(87) PCT Pub. No.: WO2007/134110
PCT Pub. Date: Nov. 22, 2007

(65) Prior Publication Data
US 2009/0173434 A1 Jul. 9, 2009

(30) Foreign Application Priority Data
May 10, 2006 (JP) .................................. 2006-131247

(51) Int. Cl.
*B29D 7/00* (2006.01)
*B29C 39/14* (2006.01)
(52) U.S. Cl. .......................... 264/214; 425/101; 425/362
(58) Field of Classification Search .................. 264/214; 425/101, 362, 364 R
See application file for complete search history.

(56) References Cited

U.S. PATENT DOCUMENTS

| | | | | |
|---|---|---|---|---|
| 3,594,865 | A | * | 7/1971 | Erb .............................. 425/129.1 |
| 4,912,948 | A | | 4/1990 | Brown |
| 5,015,266 | A | | 5/1991 | Yamamoto |
| 5,378,251 | A | * | 1/1995 | Culler et al. .................... 51/295 |

FOREIGN PATENT DOCUMENTS

| | | |
|---|---|---|
| JP | 58-059010 | 4/1983 |
| JP | 2001-225348 | 8/2001 |
| JP | 2003-053233 | 2/2003 |
| JP | 2003-236434 | 8/2003 |
| KR | 2001-0030834 | 4/2001 |
| WO | WO 94/15752 | 7/1994 |
| WO | WO 95/07797 | 3/1995 |
| WO | WO 98/41904 | 9/1998 |

* cited by examiner

*Primary Examiner* — Yogendra N Gupta
*Assistant Examiner* — Alison Hindenlang
(74) *Attorney, Agent, or Firm* — Scott A. Baum

(57) ABSTRACT

To provide a method and a device for replicating structure which was capable of accurately replicating structure, even if a composition which was an object to be molded, has a relatively high viscosity. [Means for Solving] A method for replicating structure comprising the steps of: providing a film-form production tool having a front surface and a back surface, with a reversed shape of structure which is an object to be replicated, on the front surface; applying decompression to the front surface of the film-form production tool; sealing the reversed shape to keep decompression degree applied; filling a composition which is an object to be molded, with applying sufficient fluid pressure, in the reversed shape; and solidifying the object composition and transferring it on a substrate.

8 Claims, 2 Drawing Sheets

METHOD AND DEVICE FOR REPLICATING STRUCTURE

CROSS REFERENCE TO RELATED APPLICATIONS

This application is a national stage filing under 35 U.S.C. 371 of PCT/US2007/068573, filed May 9, 2007, which claims priority to Japanese Patent Application No. 2006-131247, filed May 10, 2006, the disclosure of which is incorporated by reference in its/their entirety herein.

FIELD OF THE INVENTION

The present invention relates to a method and a device for replicating structure, and more particularly to a method and a device for continuously replicating structure.

BACKGROUND

Three dimensional structures are widely used as constitutional elements for structured coated abrasive materials, retro-reflective materials, Fresnel lenses, mechanical fasteners, and the like. Three dimensional structures having fine cube-corners, trigonals, pyramids, stripes sequentially formed on a plane surface, are the examples thereof. Industrially, such structures are formed by casting a resin into a mold with a reversed shape of a three dimensional structure to replicate it.

Japanese Patent Kohyo Publication No. H8-505572, Japanese Patent Kohyo Publication No. H9-502665 and Japanese Patent Kokai Publication No. 2003-236434 and the like describe methods and devices for continuously replicating a three dimensional structure by using a film-form production tool with a reversed shape of the structure which is an object to be replicated, on a surface. According to these methods, basically, a composition comprising a solidifiable resin is coated on a reversed shape of structure on a film-form production tool while it is being sent, a substrate is laminated thereon, the composition is solidified, and then the film-form production tool is removed from the cured resin.

The conventional methods for replicating structure are effective when compositions, objects to be molded, have a relatively low viscosity. When a high viscosity resin or composition is simply coated on a surface of a shape on a film-form production tool, however, it can be difficult for the resin or composition to penetrate into the inside of the shape, and moreover, air inclusion occurs, whereby it is hard to replicate the structure accurately.

On the other hand, decompression die coaters have hitherto been known. For example, Japanese Patent Kokai Publication No. 2003-236434 describes that in order to prevent coating unevenness, a coating film is formed on a substrate by using decompression die coater part. FIG. 1 of the publication 3 shows an embodiment wherein a coating film 14b is formed on a web 12 by using a slot die 13 with an discharge outlet 16a for a coating liquid 14. FIG. 1 does not clearly depict, but a blank space under the slot die 13 shows a decompression chamber.

According to this coating embodiment, the web 12, which is an article to be coated, is wound around a backup roll 11. This structure does not allow the web 12 to move toward the backup roll 11, thereby necessarily forming a space between the surface to be coated of the web 12 and the discharge outlet, by the thickness of the coating film. In other words, the surface to be coated of the web does not contact to a surface 18a of the discharge outlet of the slot die 13. Consequently, the conventional decompression die coater part must have such structure that coating liquid flows back toward the decompression chamber.

As a result, the conventional decompression die coater part cannot sufficiently enhance decompression degree of the decompression chamber, and it can be difficult to effectively impregnate high viscosity resin compositions into the inside of structure in a production tooling, even if they are used as coating means.

SUMMARY OF THE INVENTION

The present invention intends to solve the above-mentioned disadvantages, and the object thereof is to provide a method and device for accurately replicating structure.

Means for Solving the Problems

In one embodiment, the present invention provides a method for replicating structure comprising the steps of:
providing a film-form production tool having a front surface and a back surface, with a reversed shape of structure which is an object to be replicated, on the front surface;
applying decompression to the front surface of the film-form production tool;
sealing the reversed shape to keep decompression degree applied;
filling a composition which is an object to be molded, with applying sufficient fluid pressure, in the reversed shape; and
solidifying the object composition and transferring it on a substrate.

In another embodiment, the present invention provides a device for replicating structure comprising:
a decompression die coater part having a decompression opening, a plane face for supporting a film-form production tool, an outlet for discharging a composition which is an object to be molded, and a die coating surface, in sequential manner;
a film-form production tool having a front surface and a back surface, with a reversed shape of structure which is an object to be replicated, on the front surface, and placed so that the front surface faces the die coater part, wherein the front surface,
covers the decompression opening,
substantially contacts the face for supporting a film-form production tool,
covers the discharge outlet and the die coating surface, and keeps approximately certain distance over the die coating surface;
means for supporting the back surface of the film-form production tool at the position corresponding to the discharge outlet or the die coating surface;
means for moving the film-form production tool in the direction of from the decompression opening to the discharge outlet of the decompression die coater part; and
means for solidifying the composition which is the object to be molded, filled in the reversed shape, and transferring it on a substrate.

According to the method and device of the present invention, a high decompression degree is kept until inside of a reversed shape of structure on a film-form production tool is filled with a composition which is an object to be molded. A liquid pressure of a composition which is an object to be molded, is also sufficiently applied to the reversed shape of the structure. As a result, the composition which is the object to be molded, can completely penetrate into inside of the structure of the reversed shape in every corner, thus resulting in the accurate replication of the structure.

DETAILED DESCRIPTION

Figure 1:
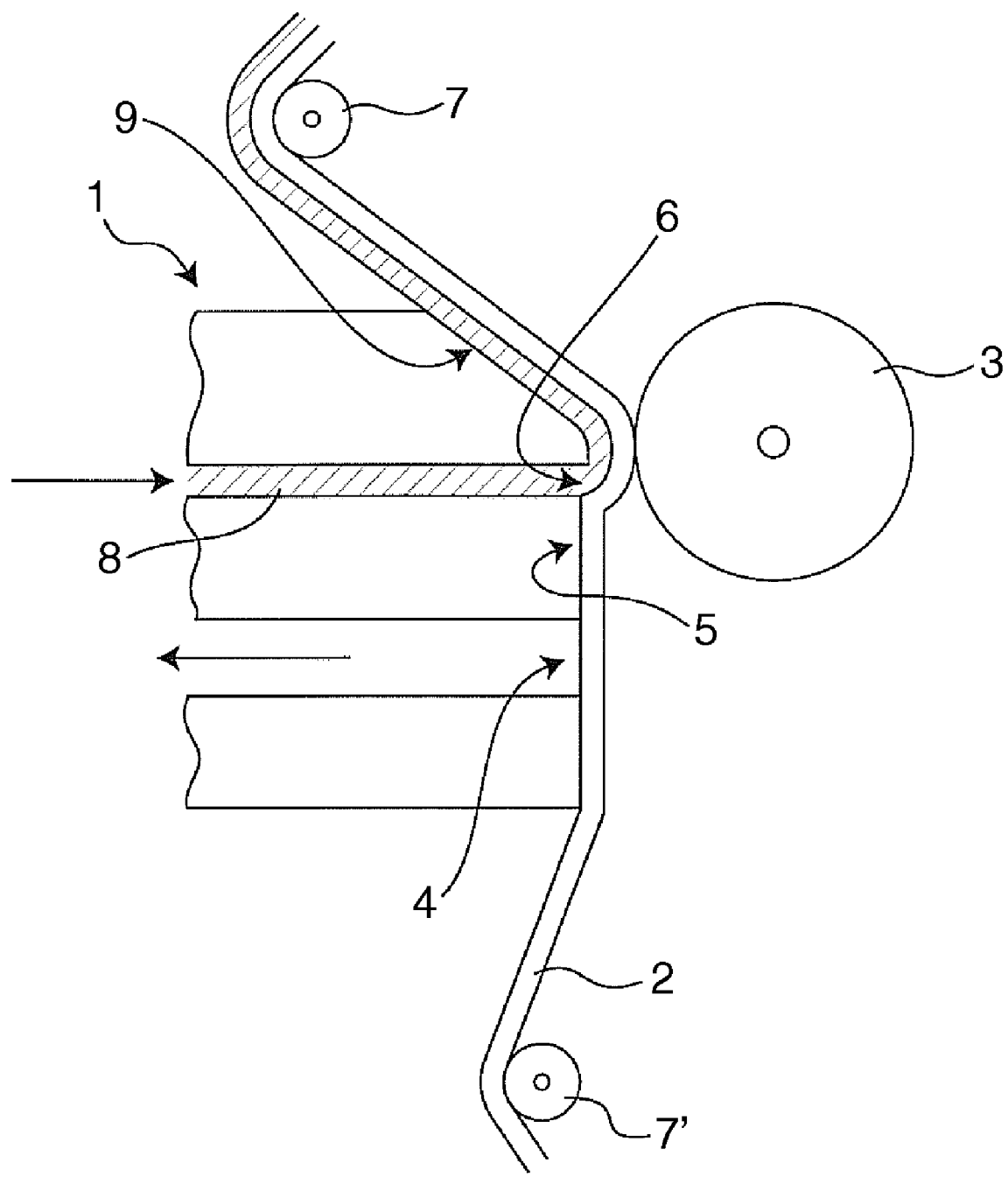
FIG. 1 is a cross-sectional view showing schematically structure of a device for replicating structure which was one embodiment of the present invention.

FIG. 1 is a cross-sectional view showing schematically structure of a device for replicating structure which is one embodiment of the present invention. The device comprises a decompression die coater part 1, a film-form production tool 2, and a backup roll 3. The decompression die coater part 1 comprises a decompression opening 4, a face for supporting a film-form production tool 5, outlet for discharging a composition which is an object to be molded 6, and a die coating surface 9, in sequential manner. The wording "in sequential manner" used herein means that the face for supporting a film-form production tool 5 exists between the decompression opening 4 and the discharge outlet 6, and the discharge outlet 6 exists between the film-form production tool 5 and the die coating surface 9.

The film-form production tool 2 is a film with a reversed shape of structure which is an object to be replicated on its front surface. The structure, the object to be replicated, for example microstructure preferably is constituted of separated plural projections. The projections may have the base-face shape of dot form or rod form. The projections typically have the side-face shape with a top part that is not wider than its bottom part, because when the top part of the shape is wider than the bottom part, it can be difficult to remove the molding. Examples of the shape with a top part not wider than the bottom part are cubes, cylinders, rectangular columns, circular cones, circular truncated cones, triangular pyramids, quadrangular pyramids, pyramids, pyramids such as cube corners, truncated pyramids, and the like.

In the structure, the shape of the projections may be the same as or different from each other. The projections may also be arranged regularly or irregularly.

The projection with such a geometric shape has a diameter or a length of the base face of about 5 to 50000 μm, preferably 10 to 10000 μm, more preferably 20 to 5000 μm. The height of the projections is about 2 to μm, preferably 5 to 5000 μm, more preferably 10 to 2000 μm. The density of the projections is about 0.04 to ten million projections per $cm^2$, preferably 1 to two million projections per $cm^2$, more preferably 4 to five hundred thousand projections per $cm^2$.

The film-form production tool may be prepared from thermoplastic resins, thermosetting resins, or photocurable resins. Examples of the thermoplastic resin from which the film-form production tool is prepared include polyesters, polycarbonates, poly(ethersulfones), poly(methyl methacrylate), polyurethanes, polyvinyl chloride, polyolefins, polystyrene, and the mixtures thereof. These materials may substantially be transparent to UV rays and visible light.

The thermoplastic resin is embossed with a tool with a basic pattern to form a structure with a reversed shape, which is an object to be replicated. Embossing is performed while the thermoplastic resin has flowability. After the embossing is finished, the thermoplastic resin is cooled to solidify. The tool with a pattern for use in embossing is made of a metal such as nickel, and the same structure as that of the object to be replicated is previously formed on its surface.

Examples of the thermosetting resin from which the film-form production tool is prepared include silicone resins, fluorocarbon resins, and the like. Examples of the photocurable resin from which the film-form production tool is prepared include acrylate urethane oligomers, and the like.

When the film-form production tool is prepared from the thermosetting resin, first, a thermosetting resin, which is not cured yet, is coated on a tool with a basic pattern. Then, the resin is solidified by curing or polymerizing with heat so as to have a reversed shape to the basic pattern of the tool. Finally, the cured resin is removed from the tool with the basic pattern. When the film-form production tool is prepared from the photocurable resin, it is prepared in the same manner as in the preparation of the production tooling from the thermosetting resin except that the resin is cured by radiating radial rays such as UV rays. Commercially available production film-form production tools may be used.

Furthermore, the structure with the reversed shape of the production tooling may have a releasing coating film on its surface, whereby the film-form production tool can be easily released from the molded article. Examples of the releasing coating film include films prepared from silicones and fluorochemicals.

The reversed shape formed on the film-form production tool preferably comprises a plurality of separated depressions or cavities. An opening of the depression has a regular or irregular shape such as rectangle, semicircle, circle, triangle, square, hexagon and octagon. A wall of the depression may be straight or chamfered. The configuration of the depressions may be regular or irregular. The edge around the depression may have contact with an adjacent edge. The depressions may be long gutter form.

The film-form production tool 2 is placed so that the front surface with the reversed shape of the structure which is the object to be replicated, faces decompression die coater part. The film-form production tool 2 is also placed so that said surface covers the decompression opening 4, substantially contacts the face for supporting the film-form production tool 5, and covers the discharge outlet for the composition which is the object to be molded 6 and the die coating surface 9.

The surface of the film-form production tool 2 substantially contacts the face for supporting the film-form production tool 5" means that the reversed shape of the structure on the surface of the film-form production tool 2, such as each depression, can keep decompression degree applied from a decompression opening 4 until it reaches the discharge outlet 6. For example, as shown in FIG. 1, if the surfaces of the face for supporting a film-form production tool 5 and the film-form production tool 2 mate as plains, then the area around the opening of the depression contact the face for supporting a film-form production tool 5 without any space between them when they contact each other. As a result, the depression is sealed, whereby decompression degree applied from a decompression opening 4 is able to be kept until it reaches the discharge outlet 6.

The die coating surface 9 is a continuous surface extended from the discharge outlet toward the direction opposite to the face for supporting a film-form production tool 5. The die coating surface 9 may be flat or curved. The front surface of the film-form production tool keeps approximately certain distance over the die coating surface through the composition which is the object to be molded. That is the film-form production tool is placed so that the front surface wraps the die coating surface 9.

A backup roll 3 is provided at the position corresponding to the die coating surface 9 of the decompression die coater part, in order to support the film-form production tool from the back surface. The position of the backup roll 3 may be at the vicinity of the discharge outlet 6 or at some distance from the discharge outlet 6. The surface of the backup roll 3 is preferably made of a material having rubber elasticity. The backup roll preferably has a rubber hardness of 60 to 90 degrees.

By placing the film-form production tool so that the front surface wraps the die coating surface 9, and by pressing the backup roll 3 to the position at which the die coating surface 9, the composition which is the object to be molded 8 and the front surface of the film-form production tool 2 coexist, a composition which is an object to be molded is filled with sufficient liquid pressure into the reversed shape of the structure which is the object to be replicated.

Figure 2:
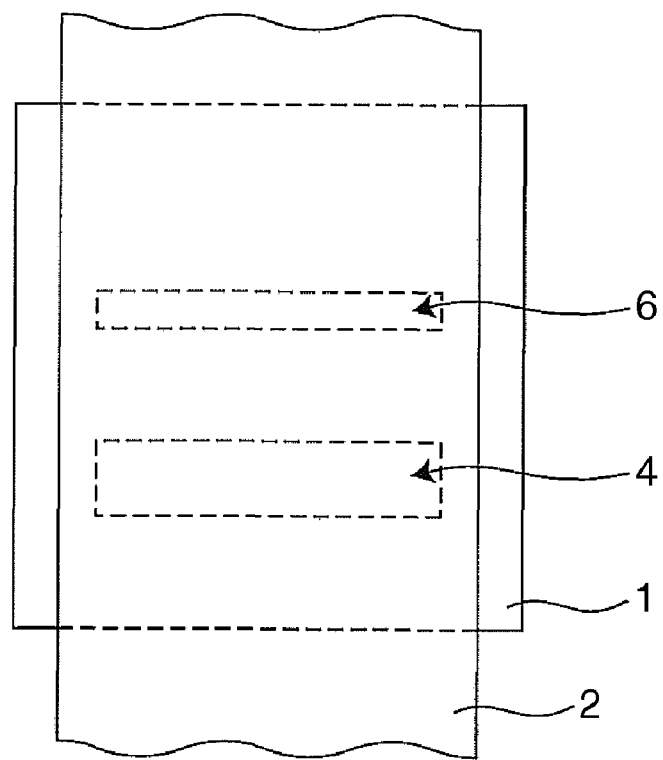
FIG. 2 is a plane view showing a positional relationship between a film-form production tool 2 and decompression die coater part 1 when they contact each other so as to keep a sealing state of a reversed shape.

FIG. 2 is a plane view showing a positional relationship between the film-form production tool 2 and the decompression die coater part 1 when they contact each other so as to keep the sealing state of the reversed shape (The backup roll 3 is not shown.). The width of a decompression opening 4 is narrower than that of the film-form production tool 2, and the width of the discharge outlet 6 for the composition which is the object to be molded, is also narrower than that of the film-form production tool 2. As a result, both a decompression opening 4 and the discharge outlet 6 are covered with the film-form production tool 2.

If necessary for ensuring a route for the film-form production tool 2, guide rolls 7 and 7', and the like, may be used. Also, as means for moving the film-form production tool 2 in the direction of the discharge outlet from a decompression opening, and means for solidifying the composition which is the object to be molded, filled in the reversed shape of the structure on a substrate and transferring it, conventionally known methods may be used.

According to the method for replicating structure of the present invention, while the film-form production tool 2 is moved in the direction of the discharge outlet 6 from a decompression opening 4, decompression is applied to the surface of the film-form production tool 2 from a decompression opening 4, and the composition which is the object to be molded 8, is extruded from the discharge outlet 6.

A moving velocity of the film-form production tool 2 is not particularly limited, and it is usually 0.1 to 100 m/min, preferably 0.5 to 50 m/min. The moving velocity less than 0.1 m/min of the film-form production tool may cause a problem in production efficiency, and that of more than 100 m/min makes it difficult to keep decompression degree.

Decompression degree applied from a decompression opening 4 is suitably decided in the light of the size of the structure, the viscosity of the composition which is the object to be molded, and the ambient temperature, and the like. Decompression degree is usually not less than 100 mmHg, preferably not less than 300 mmHg, more preferably 500 mmHg. The decompression degree of less than 100 mmHg applied from a decompression opening 4 makes it difficult to remove the air entered into the structure.

The reversed shape of the structure on the film-form production tool 2, which is applied decompression from a decompression opening 4, runs to the area of the face for supporting a film-form production tool 5, and the area around the opening contacts the face for supporting a film-form production tool 5 without any space. Then, the reversed shape runs on the face for supporting a film-form production tool 5 until it reaches the discharge outlet 6, while the reversed shape is kept to be sealed. As a result, decompression degree applied from a decompression opening 4 to the reversed shape of the film-form production tool 2 can be kept until the shape reaches the discharge outlet 6.

When the reversed shape on the film-form production tool 2 reaches the discharge outlet 6, the composition which is the object to be molded 8, is filled into the inside of the reversed shape. The composition which is the object to be molded 8, is not particularly limited so long as it has flowability and is capable of solidifying. Such a substance usually includes composition containing resins capable of solidifying. The resins capable of solidifying may include thermoplastic resins, thermosetting resins and photocurable resins. The resins are solidified with a method of drying and removing solvents, a method of curing the resins with heat or light reaction, a method of setting the molten resins with cooling, or the like.

Examples of the composition which is the object to be molded, include abrasive slurry, which is a raw material for structured coated abrasive materials, resin compositions, which are raw materials for retro-reflective materials, Fresnel lenses, mechanical fasteners, and the like.

The composition which is the object to be molded, may have a high viscosity. For example, if the composition which is the object to be molded, has a viscosity of up to about hundred thousands cps at a coating temperature, structures can be replicated by the method and the device of the present invention. In other words, the method and the device of the present invention, is able to mold finely a wide variety of resins of from 1 cps to 100,000 cps, and is able to mold resins having a higher viscosity than those used in the conventional methods. Increasing the molecular weight of a resin to be molded is effective for preventing shrinkage or deformation of molded articles.

The extrusion velocity of the composition which is the object to be molded 8, is suitably controlled so that the reversed shape on film-form production tool 2 is at least filled with the composition.

Then, the above-mentioned composition filled in the reversed shape on the film-form production tool 2 is solidified and transferred on a substrate. As means for solidifying and transferring the composition which is the object to be molded, any conventional methods such as described in Japanese Patent Kohyo Publication No. H8-505572 and Japanese Patent Kohyo Publication No. H9-502665 may be used.

For example, a substrate is laminated on the above-mentioned composition filled in the reversed shape on the film-form production tool 2, and the composition is solidified by cooling, heating or light-radiating the obtained laminate, and then the film-form production tool 2 is removed from the solidified, molded article. Sheets may usually be used as the substrate, and it may be suitably decided depending on the use.

The present invention will be described in more detail by means of non-limiting Examples. In Examples, all parts, percentages and ratios are by weight unless otherwise noted.

EXAMPLES

Example 1

A resin composition capable of solidifying was prepared by mixing components shown in Table 1.

TABLE 1

| Component | Amount (%) |
|---|---|
| Tris(acryloxyethyl) isocyanurate ("ARONIX M-315" made by Toa Gosei K.K.) | 38.31 |
| Trimethylolpropane triacrylate ("KS-TMPTA" made by Nippon Kayaku K.K.) | 57.47 |
| Photopolymerization initiator ("Irgacure 369" made by Ciba Specialty Chemicals Corp.) | 0.96 |
| Silane coupling agent ("KBM 503" made by Shin-etsu Kagaku Kogyo K.K.) | 3.26 |
| Total | 100 |

A composition which was an object to be molded, was prepared by mixing components shown in Table 2. The viscosity of the composition was determined, and was found about 50,000 cps at the ambient temperature.

TABLE 2

| Component | Amount (part) |
|---|---|
| Talc ("SG-200" made by Nippon Talc K.K.) | 50 |
| The resin composition capable of solidifying | 100 |
| Total | 150 |

Various kinds of polypropylene film-form production tool (made by 3M Company) was provided. The reversed shape on the film-form production tool was constituted with separated pyramid-shaped depressions. The depressions were regularly arranged so that the edge around the opening (square) of the depression contacted the adjacent one. One side of the opening was 150 to 700 μm, and the depth of the depression was 360 μm.

The composition which was the object to be molded, was coated on the film-form production tool by using a device having structure shown in FIG. 1. Decompression degree of the device was adjusted to 720 mmHg when the coating was performed. An easily adhesion-treated polyester film of a thickness 125 μm was laminated on the composition. A UV ray was irradiated to the laminate to cure the composition, and then the film-form production tool was removed.

Figure 3:
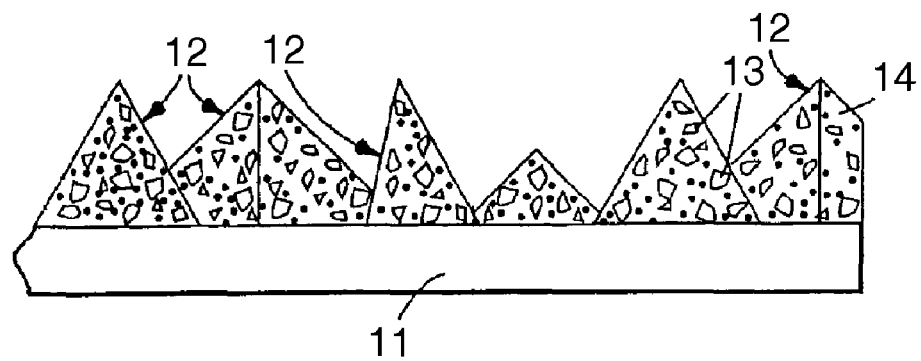
FIG. 3 is an enlarged partial view showing illustratively an appearance of the structure replicated by using the method and the device of the present invention.

FIG. 3 is an enlarged partial view showing illustratively an appearance of the structure replicated by using the method and the device of the present invention. A plurality of pyramidal shaped composite materials 12 is formed on the upper surface of polyester film 11. The composite materials 12 have a plurality of talc particles 13 dispersed in the binder 14.

The process or the device of the present invention brought not less than 95% of packing in depressions of the film-form production tool even when the composition which was an object to be molded had relatively high viscosity. As a result, the microstructure to be replicated, even when it was pyramidal shape, was precisely reproduced up to its apex.

Comparative Example

Components shown in Table 3 were mixed to give a resin composition capable of solidifying.

TABLE 3

| Component | Amount (%) |
|---|---|
| Tris(acryloxyethyl) isocyanurate ("ARONIX M-315" made by Toa Gosei K.K.) | 29.71 |
| Trimethylolpropane triacrylate ("KS-TMPTA" made by Nippon Kayaku K.K.) | 169.31 |
| Photopolymerization initiator ("Irgacure 369" made by Ciba Specialty Chemicals Corp.) | 0.96 |
| Total | 100 |

Components shown in Table 4 were mixed to prepare a composition, an object to be molded. The viscosity of the composition was determined, and was found about 30,000 cps at the ambient temperature.

TABLE 4

| Component | Amount (part) |
|---|---|
| Aluminium oxide ("WA 4000" made by Fujimi Inc.) | 100 |
| The resin composition capable of solidifying | 62.2 |
| Total | 162.2 |

The same film-form production tool as used in Example 1 was wound around a backup roll so that the reversed shape side of the film was set outwardly. The composition which was the object to be molded, was coated on the film-form production tool by using decompression die coater part in accordance with the conventional embodiment shown in FIG. 1 of Japanese Patent Kokai Publication No. 2003-236434. Decompression degree of the device was adjusted to 711 mmHg when coating was performed. An easily adhesion treated polyester film of a thickness 125 μm was laminated on the composition. A UV ray was irradiated to the laminate to cure the composition, and then the film-form production tool was removed.

A conventional process or device brought about 70% of packing in depressions of the film-form production tool when the composition which was an object to be molded had relatively high viscosity. So when the microstructure to be replicated was, for example, pyramidal shape, air easily was taken in at the apex parts of the pyramid, and some pyramidal shapes had not been precisely reproduced at their apex parts.

The invention claimed is:

1. A method for replicating structure comprising the steps of:
    providing a film-form production tool having a front surface and a back surface, with a reversed shape of structure which is an object to be replicated, on the front surface;
    wrapping the front surface of the film-form production tool about a die coating surface;
    applying decompression to the front surface of the film-form production tool;
    sealing the reversed shape to keep decompression degree applied;
    filling a composition which is an object to be molded, with applying sufficient fluid pressure, in the reversed shape; and
    solidifying the object composition and transferring it on a substrate.
2. The method of claim 1, wherein the reversed shape of the structure on the film-form production tool is composed of a plurality of separated depressions.

3. A device for replicating structure comprising:
a decompression die coater part having a decompression opening, a plane face for supporting a film-form production tool, an outlet for discharging a composition which is an object to be molded, and a die coating surface, in sequential manner, wherein the die coating surface is extended from the discharge outlet past the plane face;
a film-form production tool having a front surface and a back surface, with a reversed shape of structure which is an object to be replicated, on the front surface, and placed so that the front surface faces the die coater part, wherein the front surface,
covers the decompression opening,
substantially contacts the face for supporting a film-form production tool,
covers the discharge outlet and the die coating surface, and
keeps approximately certain distance over the die coating surface;
means for supporting the back surface of the film-form production tool at the position corresponding to the discharge outlet or the die coating surface;
means for moving the film-form production tool in the direction of from the decompression opening to the discharge outlet of the decompression die coater part; and
means for solidifying the composition which is the object to be molded, filled in the reversed shape, and transferring it on a substrate.

4. The device of claim 3, wherein the reversed shape of the structure on the film-form production tool is composed of a plurality of separated depressions.

5. A device for replicating structure comprising:
a decompression die coater part having a decompression opening, a plane face for supporting a film-form production tool, an outlet for discharging a composition which is an object to be molded, and a die coating surface, in sequential manner, wherein the die coating surface is extended from the discharge outlet past the plane face;
a film-form production tool having a front surface and a back surface, with a reversed shape of structure which is an object to be replicated, on the front surface, and placed so that the front surface faces the die coater part;
wherein the front surface, covers the decompression opening, substantially contacts the face for supporting a film-form production tool, covers the discharge outlet and the die coating surface, and keeps approximately certain distance over the die coating surface;
a backup roll for supporting the back surface of the film-form production tool at the vicinity of the discharge outlet; and
guide rolls positioned such that the front surface of the film-form production tool wraps the die coating surface.

6. The device of claim 5 wherein a surface of the backup roll is made of a material having rubber elasticity.

7. The device of claim of claim 5 wherein a center of the backup roll is positioned past the outlet and aligned with at least a portion of the die coating surface.

8. The device of claim 5 wherein the die coating surface is flat and angled away from the backup roll past the plane face.

* * * * *

UNITED STATES PATENT AND TRADEMARK OFFICE
CERTIFICATE OF CORRECTION

PATENT NO.        : 8,226,869 B2
APPLICATION NO.   : 12/299020
DATED             : July 24, 2012
INVENTOR(S)       : Masanao Shikano et al.

It is certified that error appears in the above-identified patent and that said Letters Patent is hereby corrected as shown below:

Column 8
Line 7, delete "169.31" and insert -- 69.31 --, therefor.

Column 10
Line 24, in Claim 7, delete "of claim of claim" and insert -- of claim --, therefor.

Signed and Sealed this
Thirteenth Day of November, 2012

David J. Kappos
*Director of the United States Patent and Trademark Office*